United States Patent
Lerche et al.

(10) Patent No.: US 6,472,659 B1
(45) Date of Patent: Oct. 29, 2002

(54) METHOD FOR MEASURING IONIC CURRENTS, AND A CATCHING DEVICE THEREFOR

(75) Inventors: Heinz Lerche, Stuhr-Moordeich; Johannes Schwieters, Ganderkesee, both of (DE)

(73) Assignee: Thermo Finnigan Mat GmbH, Bremen (DE)

(*) Notice: Subject to any disclaimer, the term of this patent is extended or adjusted under 35 U.S.C. 154(b) by 0 days.

(21) Appl. No.: 09/342,152

(22) Filed: Jun. 15, 1999

(30) Foreign Application Priority Data

Jun. 26, 1998 (DE) .......................... 198 28 561

(51) Int. Cl.⁷ .................. G01D 18/00; G12B 13/00; B01D 59/44
(52) U.S. Cl. .............. 250/252.1; 250/281; 250/282
(58) Field of Search ............... 250/281, 282, 250/252.1

(56) References Cited

U.S. PATENT DOCUMENTS

| | | | | |
|---|---|---|---|---|
| 4,164,652 A | * | 8/1979 | Wollnik | 250/281 |
| 4,495,413 A | * | 1/1985 | Lerche et al. | 250/252.1 |
| 5,321,261 A | * | 6/1994 | Valenta | 250/252.1 |

* cited by examiner

Primary Examiner—John R. Lee
Assistant Examiner—David A. Vanore
(74) Attorney, Agent, or Firm—Dorsey & Whitney LLP

(57) ABSTRACT

The invention relates to a novel method for measuring ionic currents when determining isotope ratios and suing a mass spectrometer. Two or more ionic currents are measured in parallel, that is to say caught by catchers and evaluated via respectively assigned electronic measuring system. The assignments between catchers and electronic measuring systems are changed as time progresses.

8 Claims, 1 Drawing Sheet

METHOD FOR MEASURING IONIC CURRENTS, AND A CATCHING DEVICE THEREFOR

Figure 1:
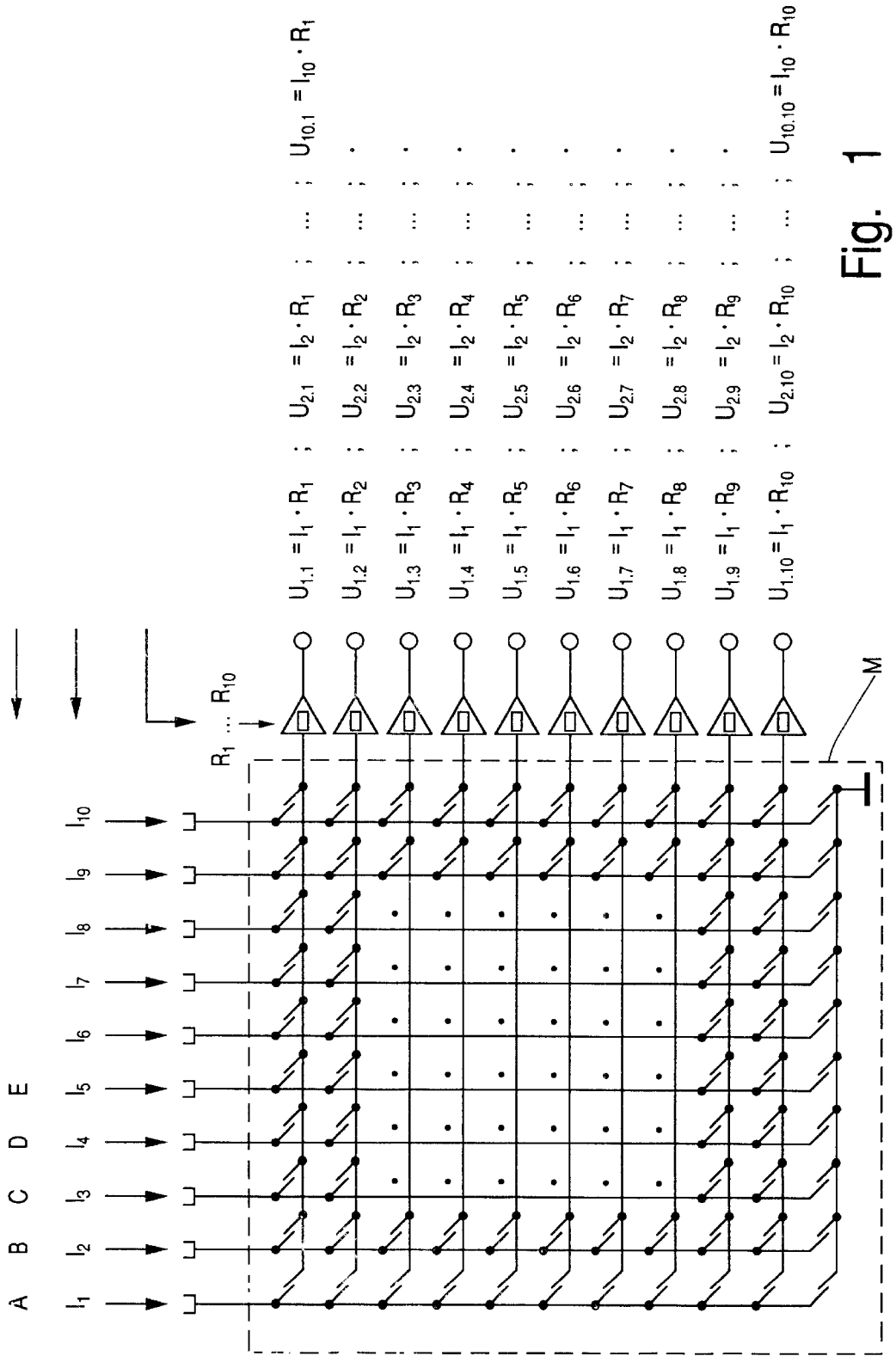

The invention relates to a method for measuring temporally constant signal ratios, in particular ionic currents for measuring isotope ratios, preferably by using a mass spectrometer, two or more signals being measured in parallel, that is to say being caught by a catching device having two or more catchers, and evaluated in a measuring device having two or more channels. The invention also relates to a catching device and a mass spectrometer having such a catching device.

BACKGROUND OF THE INVENTION

The invention proceeds from a prior art as disclosed in DE 31 39 975 C2 (corresponding to U.S. Pat. No. 4 495 413). Reference is expressly made to the prior art described there.

The main field of application of the invention is the high precision measurement of isotope ratios. Mass spectrometers having a plurality of ion catchers are known to be used for this purpose. The separate ionic currents are measured in parallel in these catchers. As a result, the desired measurements can be carried out substantially more quickly and precisely than in mass spectrometers having only one catcher. Temporal fluctuations in the signal intensities occur at all catchers simultaneously and do not influence the measuring accuracy for the signal ratio.

Each catcher has a dedicated electronic measuring system and is part of a measuring channel. Constituents of the electronic measuring systems are, for example, current amplifiers, voltage-to-frequency converters, digital voltmeters or digital ammeters. The ionic currents caught by a catcher are measured (amplified) and evaluated in the assigned electronic measuring system.

Being able to intercompare the measured signals quantitatively requires calibration of the electronic measuring systems of the various measuring channels relative to one another. It is precisely this which is done by the method described in the Patent '431 specified above. The gains $G_i$ thus determined for the individual signal amplifiers (current amplifiers) i can, however, be measured in practice only with a limited accuracy $dG_i$. The accuracy $dG_i$ is given in practice by the noise of the amplifiers and the noise of the calibration source, and by the limited stability of the overall system. The relative calibration uncertainty $dG_i/G_i$ in the best present-day systems is approximately equal to 5 ppm (1 Stdev) per measuring channel. This calibration uncertainty represents the limit of the measuring accuracy with present-day systems.

The isotope ratio $IR(A,B)$ of the isotopes A and B is calculated as follows taking account of the gains $G_1$ and $G_2$:

$$IR(A, B) = \frac{G_1 \times I_A}{G_2 \times I_B} \qquad \text{Equ. 1}$$

A calibration uncertainty $dG_1$ is continued directly into the uncertainty of the measured isotope ratio $IR(A,B)$ as:

$$dIR(A, B) = \frac{I_A}{G_2 \times I_B} \times dG_1 \text{ and} \qquad \text{Equ. 2}$$

$$\frac{dIR(A, B)}{IR(A, B)} = \frac{dG_1}{G_1} \qquad \text{Equ. 3}$$

Since the calibration of the two amplifiers involved (gains $G_1$, $G_2$) are mutually independent, the uncertainty defined in equation 3 can be estimated as follows:

$$\frac{dIR(A, B)}{IR(A, B)} = \sqrt{\left(\frac{dG_1}{G_1}\right)^2 + \left(\frac{dG_2}{G_2}\right)^2} \qquad \text{Equ. 4}$$

With a relative uncertainty of $$\frac{dG}{G} \cong 5 \text{ ppm} \qquad \text{Equ. 5}$$

per measuring channel, the overall result of this is a measuring uncertainty of $$\frac{dIR(A, B)}{IR(A, B)} \cong 7 \text{ ppm} \qquad \text{Equ. 6}$$

This precision represents the limit of present-day technology.

In fact, the calibration uncertainty can also be improved by frequent repetition. With a calibration time per measuring channel of approximately one minute, approximately ten minutes result as overall calibration time with the in practice frequently up to ten measuring channels. The measuring system would have to be calibrated approximately 25 times for the statistical improvement of the reliability of the calibration from approximately 5ppm to 1 ppm. The mean value of the calibrations would then have a precision of 1 ppm, assuming the overall system has remained stable over the time interval of 250 minutes at 1 ppm. In practice, this condition can be ensured only with difficulty.

OBJECT AND SUMMARY OF INVENTION

It is the object of the present invention to create a method with the aid of which the measuring uncertainty can be further reduced overall. In particular, the starting point in this case is the method described in the above patent.

According to the invention, the object is achieved by means of the following features:

a) the measurement is subdivided into sequential time periods (measuring blocks), b) in a first time period a specific catcher is assigned to each electronic measuring system and c) the assignment of the catcher and electronic measuring system is changed in the next time period so that then each electronic measuring system is assigned to a different catcher than in the preceding time period.

The measurement results thus obtained are subjected to averaging. The influence of the calibration uncertainty of the individual measuring channels on the achievable precision is thereby eliminated. The method is advantageous, in particular, for measuring ionic currents when determining isotope ratios. Moreover, it is possible using the invention generally to improve the measurement of temporally constant signal ratios. The term "catcher" then relates to any device which catches or records signals.

Advantageously, measurements are carried out over at least as many time periods as there are measuring channels, that is to say electronic measuring systems with catchers, present. Each catcher is thereby interconnected at least once with each electronic measuring system.

To carry out the method, the measuring system used is characterized by a device (relay matrix) for alternately interconnecting the catchers and the electronic measuring systems in such a way that each electronic measuring system can alternately be connected to one of a plurality of catchers. The relay matrix is thus a switch system for the alternating connection of the catchers to the electronic measuring systems.

Further features of the invention follow from the remainder of the description and from the claims. In this case, the invention also comprises a mass spectrometer having a measuring system.

DETAILED DESCRIPTION OF PREFERRED EMBODIMENT

The invention is explained in more detail below with the aid of an example and of the sole FIGURE.

In the novel method, the measuring channels are firstly calibrated as described in the above patent. This calibration is not mandatory, but advantageous in practice. Thereafter, the actual measurement of the signals, for example ionic currents of the separated isotopes, begins. N Signals are to be measured in parallel in N separate catchers. 10 catchers ($I_1$–$I_{10}$) are drawn in the FIGURE. The assignment of electronic measuring systems ($R_1$–$R_{10}$) to the catchers is not hard-wired, but can be connected at will with s the aid of a relay matrix M. The latter comprises all the components (relays) provided in the rectangle drawn with dashes in the Figure.

Each electronic measuring system can be combined with each catcher. The relay matrix is the essential novelty in the measuring method according to the invention, and permits the electronic measuring systems to be systematically exchanged between the various catchers during measurement.

The measurement is subdivided into groups of N measuring blocks (time periods). After each measuring block, the assignment of the N electronic measuring systems to the N catchers is changed over via the relay matrix, with the result that after N measuring blocks all the ionic currents are measured with the same set of N current amplifiers. As an example, the method is explained with reference to a measurement using four measuring channels and four isotopes:

The isotopes A, B, C, D, are measured in parallel in the four measuring channels 1–4. The measurement is split up into four blocks (time periods). The measuring cycle is illustrated in the following table:

TABLE 1

| Blocks | Isotope A Catcher #1 | Isotope B Catcher #2 | Isotope C Catcher #3 | Isotope D Catcher #4 |
|---|---|---|---|---|
| 1 | $G_1$ | $G_2$ | $G_3$ | $G_4$ |
| 2 | $G_2$ | $G_3$ | $G_4$ | $G_1$ |
| 3 | $G_3$ | $G_4$ | $G_1$ | $G_2$ |
| 4 | $G_4$ | $G_1$ | $G_2$ | $G_3$ |

In the first block, the electronic measuring system having the gain $G_1$ is connected to the catcher 1, etc.

The relay matrix is used between the block 1 and block 2 in order to switch the electronic measuring system with the gain $G_1$ to the catcher 4, the electronic measuring system ($G_2$) is switched to the catcher 1, etc. In the next measuring blocks, the relay matrix is systematically progressed in accordance with the pattern specified in the table. In order to simplify the table, the amplifiers were exchanged cyclically after each block in this example. This condition is not necessary, but it does simplify the representation.

The mean value for a specific isotope ratio IR(A,B) is calculated as:

$$\overline{IR(A,B)} = \left( \sum_{i=1}^{N-1} \frac{G_i \times I_A}{G_{i+1} \times I_B} + \frac{G_N \times I_A}{G_1 \times I_B} \right) \frac{1}{N} \quad \text{Equ. 7}$$

A calibration uncertainty $dG_k$ has the following effect on the uncertainty of the mean value:

$$\overline{dIR(A,B)} = \frac{I_A}{G_{k+1} \times I_B} dG_k - \frac{G_{k-1} \times I_A}{G_k^2 \times I_B} \times dG_k \quad \text{Equ. 8}$$

$$\overline{dIR(A,B)} = \left[ \frac{G_k \times I_A}{G_{k+1} \times I_B} - \frac{G_{k+1} \times I_A}{G_k \times I_B} \right] \times \frac{dG_k}{G_k} \quad \text{Equ. 9}$$

$$= [IR(A,B) - IR(A,B)] \times \frac{dG_k}{G_k}$$

$$= 0$$

This calculation shows that the calibration uncertainty of an amplifier k no longer plays a role in the first order for the mean value in accordance with equation 7. Consequently, the influence of the calibration uncertainty on the end result is eliminated. Ideally, it is always precisely N measuring blocks (time periods) which are measured for the measurement of signals. Consequently, the measurement should be organized as far as possible in groups of N measuring blocks. However, this is not mandatory. A one-off changeover of the relay matrix is enough statistically to lead to an improvement in the correctness of the measurement, since then averaging has already been carried out via two calibration units of two different, but equivalent electronic measuring systems.

The invention is explained below with a numerical example:

It may be assumed that 4 measuring channels with the gains $G_1$ to $G_4$ participate in the measurement. The aim is to measure the four signals $I_A$, $I_B$, $I_C$, $I_D$. The three signal ratios

IR(B,A)

IR(C,A)

IR(D,A)

are to be determined accurately and correctly, that is to say without the calibration uncertainties dGi.

Use is made for this purpose of the systematic method, specified in Table 1, of exchanging the electronic measuring systems with respect to the catchers. The measurement is thus carried out in four blocks with different combinations of catcher and electronic measuring system. The following calibration uncertainties may be assumed here, for example, for the four measuring channels in order to illustrate the effect:

$$\frac{dG_1}{G_1} = 10 \text{ ppm}$$

$$\frac{dG_2}{G_2} = 20 \text{ ppm}$$

$$\frac{dG_3}{G_3} = 30 \text{ ppm}$$

$$\frac{dG_4}{G_4} = -20 \text{ ppm}$$

10 ppm (parts per million) relative deviation signifies:
10 ppm=0.000010
The true intensities may be taken as:
$I_A=1$
$I_B=1$
$I_C=2$
$I_D=5$ The measured signal ratios in all four blocks are represented in the following Table 2:

|  | IR (B, A) | IR (C, A) | IR (D, A) |
|---|---|---|---|
| 1st Block | 1.00000999990 | 2.00003999960 | 4.99980000400 |
| 2nd Block | 1.00000999980 | 1.99992000160 | 4.99990000300 |
| 3rd Block | 0.99995000150 | 1.99996000120 | 5.00020000400 |
| 4th Block | 1.00003000060 | 2.00008000160 | 5.00009999900 |
| Mean value | 1.00000000045 | 2.00000000100 | 5.00000000250 |
| Rel. error in ppm | 0.000449993 | 0.000499996 | 0.000499996 |

Although the individual measuring channels are inaccurately calibrated with an uncertainty of −20 ppm to +30 ppm, the mean value after traversing 4 blocks is more correct approximately by factor 10000.

The novel method offers advantages in the precise measurement of signal ratios. In this case, the different signals are detected in parallel in separate measuring channels. The influence of the calibration uncertainty of the individual measuring channels on the achievable precision is eliminated. This holds approximately even when the calibration of the current amplifiers drifts. It is favourable in this case to exchange the amplifiers in two complete cycles. In this process, the exchange sequence is precisely reversed after the first cycle. Thus, if the first exchange sequence was organized cyclically (for example 1, 2, 3, 4), the second exchange sequence is carried out anti-cyclically (that is to say, 4, 3, 2, 1). Drifting of the calibration in the first order is averaged out by means of this cyclic and anti-cyclic exchange sequence. In the example discussed above with four parallel measuring channels, this means measuring eight blocks having the exchange pattern represented in the following table:

TABLE 3

| Blocks | Isotope A Catcher #1 | Isotope B Catcher #2 | Isotope C Catcher #3 | Isotope D Catcher #4 |
|---|---|---|---|---|
| 1 | $G_1$ | $G_2$ | $G_3$ | $G_4$ |
| 2 | $G_2$ | $G_3$ | $G_4$ | $G_1$ |
| 3 | $G_3$ | $G_4$ | $G_1$ | $G_2$ |
| 4 | $G_4$ | $G_1$ | $G_2$ | $G_3$ |
| 5 | $G_4$ | $G_1$ | $G_2$ | $G_3$ |
| 6 | $G_3$ | $G_4$ | $G_1$ | $G_2$ |
| 7 | $G_2$ | $G_3$ | $G_4$ | $G_1$ |
| 8 | $G_1$ $G_2$ | $G_3$ | $G_4$ |  |

The novel measuring method also has advantages when it is necessary to measure very small signals in the case of which the noise of the measuring system supplements the achievable precision and the measuring signal is available only for a limited time. In the case of these time-critical measurements, there is the problem of measuring the small, noisy signals and, at the same time, of tracking the base line of the measuring system as well as possible. In the case of the prior measuring system, measurement is subdivided into blocks. The base line is repeatedly measured anew between two measuring blocks. This costs measuring time, since the signal cannot be measured during the base line measurement. This calibration time is lost to the measurement of the signals, and thereby reduces the precision which can be achieved in principle.

The novel measuring system with the relay matrix between the catchers and the measuring channels permits a different mode of procedure. If, for example, four signals are to be measured, but a total of eight or more measuring channels are available, it is possible to use four measuring channels in order to measure the four signals. The base line of the four remaining amplifiers is measured in parallel therewith. Subsequently, the four newly calibrated amplifiers are switched to the catchers, and the amplifiers previously used for signal measurement are now calibrated anew. This nested method eliminates the dead time between the blocks and *p+11X permits the maximum measuring time for the small signals, and thus an optimum utilization of the measuring time in simultaneous conjunction with the best possible monitoring of the base line.

In addition to the catchers ($I_1$–$I_{10}$), the electronic measuring systems ($R_1$–$R_{10}$) and the relay matrix M, the individual resultant voltages and the calculation of the isotope ratios are represented in the sole FIGURE. The ratio of the ionic currents $I_2$ to $I_1$ (isotope A, B) is found after carrying out all the measurements via the following $$I_1 = \frac{\sum U_1}{\sum R}, I_2 = \frac{\sum U_2}{\sum R}, \ldots I_{10} = \frac{\sum U_{10}}{\sum R} \qquad \text{Equ. 10}$$

$$\frac{I_2}{I_1} = \frac{\sum U_2}{\sum U_1}, \ldots \frac{I_{10}}{I_1} = \frac{\sum U_{10}}{\sum U_1} \qquad \text{Equ. 11}$$

The ionic current $I_1$, is determined computationally by adding all the voltages $U_{1,1}$–$U_{1,10}$ and dividing the sum by the sum of the resistors $R_1$–$R_{10}$. In this case, the value for the resistor R ($R_1$–$R_{10}$) represents the gain of the respective electronic measuring system.

What is claimed is:

1. A method for measuring temporally constant signal ratios, in particular ionic currents for measuring isotope ratios, preferably by using a mass spectrometer, two or more signals being measured in parallel by a catching device having two or more catchers, and evaluated in a measuring device having two or more electronic measuring systems, characterized by the following features:
   a) subdividing the measurement into sequential time periods (measuring blocks);
   b) in a first time period, assigning a specific catcher to each electronic measuring system to collect first measurement values;
   c) changing the assignment of the catcher and electronic measuring system in the next time period to collect next measurement values so that each electronic measuring system is assigned to a different catcher than in the preceding time period; and
   d) evaluating the first and next measurement values.

2. The method according to claim 1, characterized in that subdividing the measurement at least as many time periods as there are measuring channels comprised of catchers and electronic measuring systems present.

3. The method according to claim 1, characterized in that each time period is assigned between an electronic measuring system and a catcher which are not assigned in the preceding time period for the same measurement, at least until the number of the time periods elapsed is less than or equal to the number of the measuring channels.

4. The method according to claim 1, characterized in that the number of the time periods corresponds to a multiple of, at least twice the number of the measuring channels comprised of catchers and electronic measuring systems, in that the assignment between catchers and electronic measuring systems is changed from time period to time period in a specific sequence until each combination of catcher and electronic measuring system has been carried out once, and in that the assignment between catchers and electronic measuring systems is changed in the reverse sequence so that after expiry over twice as many time periods the assignment of catchers and electronic measuring systems set at the beginning is finally reset.

5. The method for measuring temporally constant signals, in particular ionic currents for measuring isotope ratios, preferably by using a mass spectrometer, two or more signals being measured in parallel by a catching device having two or more catchers, and evaluated in a measuring device having two or more electronic measuring systems, characterized by the following features:

a) subdividing the measurement into sequential time periods (measuring blocks);

b) providing more measuring channels comprised of catchers and electronic measuring systems than measuring signals;

c) in a first time period, feeding the signals from a first group of catchers to a first group of electronic measuring systems, while a second group of catchers receiving no signals and the group of electronic measuring systems connected thereto being calibrated, in particular, by measuring a base line; and d) in a second time period, feeding the signals from the first group of catchers to the second group of electronic measuring systems, while the first group of electronic measuring systems assigned to the second group of catchers being calibrated.

6. A measuring system for temporally constant signal ratios, in particular for parallel ionic currents, with two or more measuring channels each having a catcher and an electronic measuring system, characterized by a device (relay matrix) for alternately interconnecting the catchers and the electronic measuring systems in such a way that each electronic measuring system can alternately be connected to one or a plurality of catchers.

7. The measuring system according to claim 6, characterized in that each electronic measuring system can be connected alternatively to each catcher.

8. A mass spectrometer having a measuring system according to claim 6 or 7.

* * * * *